United States Patent

[11] 3,568,682

| [72] | Inventors | William H. Knapp<br>Davenport, Iowa;<br>Richard E. Benson, East Moline, Ill. |
|---|---|---|
| [21] | Appl. No. | 858,694 |
| [22] | Filed | Sept. 17, 1969 |
| [45] | Patented | Mar. 9, 1971 |
| [73] | Assignee | International Harvester Company<br>Chicago, Ill. |

[54] GRATE FOR AXIAL FLOW COMBINE
7 Claims, 4 Drawing Figs.

[52] U.S. Cl. .................................................. 130/27
[51] Int. Cl. .............................................. A01f 12/26
[50] Field of Search ......................................... 130/27, 27 (H), 27 (T)

[56] References Cited
UNITED STATES PATENTS

| 2,743,728 | 5/1956 | Carlson ...................... | 130/27H |
| 2,833,288 | 5/1958 | Scranton .................... | 130/27H |
| 3,470,881 | 10/1969 | Knapp et al. ................ | 130/27T |

Primary Examiner—Antonio F. Guida
Attorney—Noel G. Artman

ABSTRACT: A removable grate for an axial flow combine made up of a plurality of independent sections each of which are of a weight and size that can be readily handled by the combine operator. An access opening is formed in the combine sidewall through which sections of the grate can pass and be slid into a shelflike retainer. The last section is secured into place by locking means and serves to hold the other sections in place.

PATENTED MAR 9 1971

INVENTORS
WILLIAM H. KNAPP
RICHARD E. BENSON

BY *David McBuley* ATT'Y.

PATENTED MAR 9 1971
3,568,682
SHEET 2 OF 2
FIG-2-
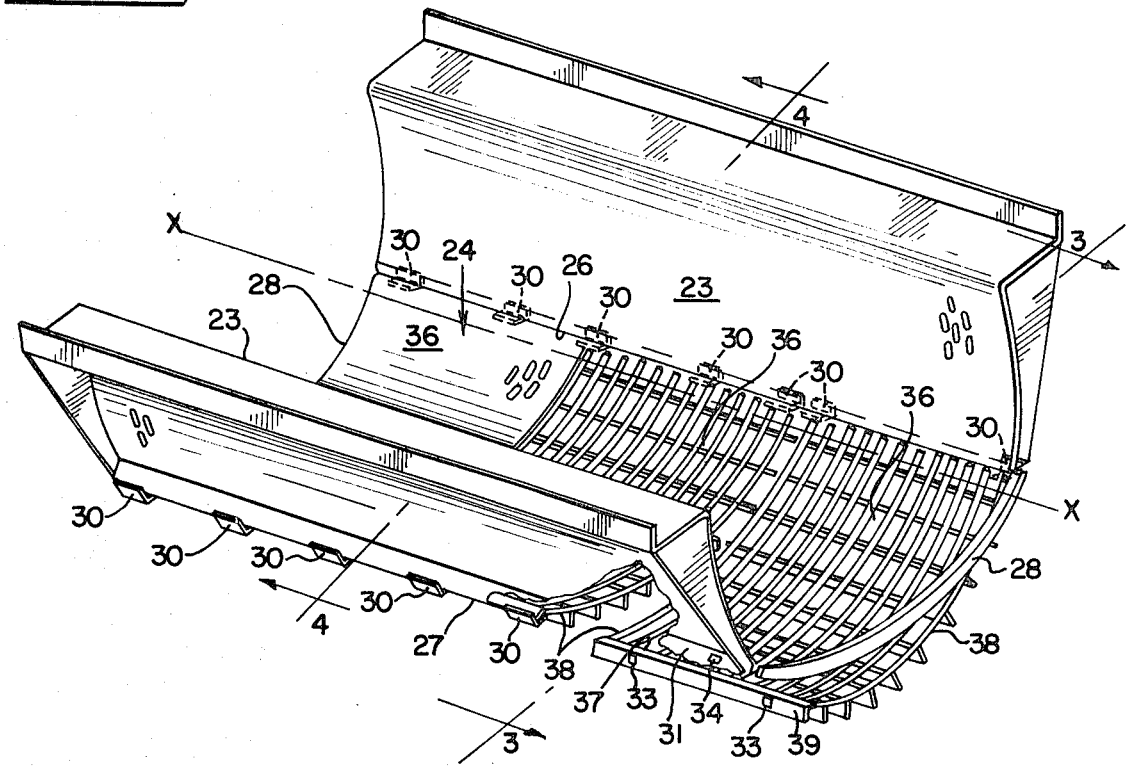
FIG-3-
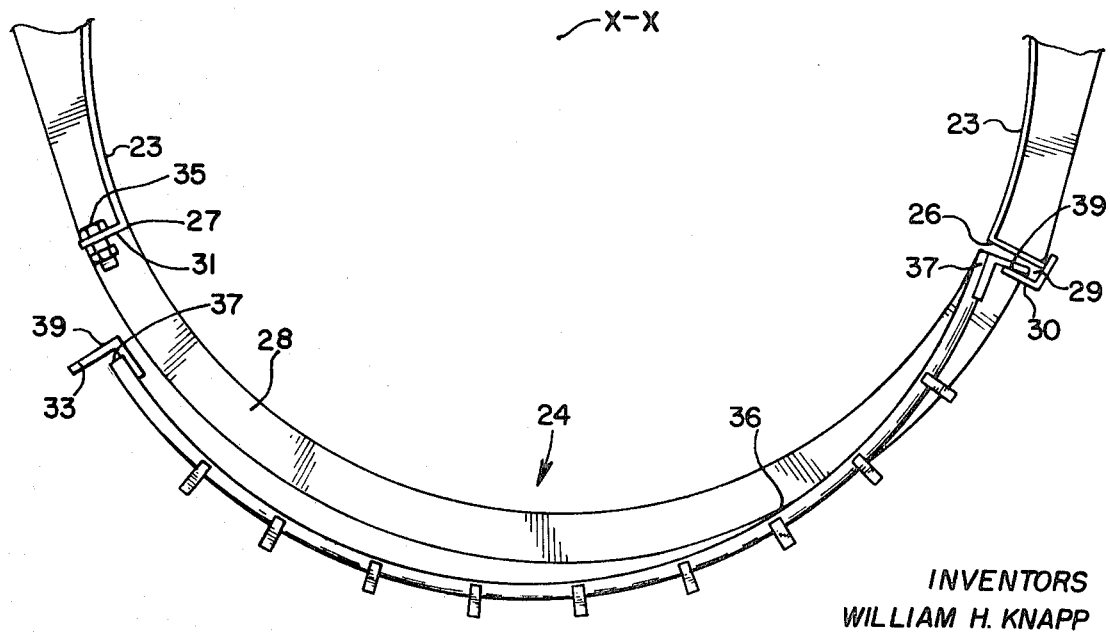
INVENTORS
WILLIAM H. KNAPP
RICHARD E. BENSON
ATT'Y.

GRATE FOR AXIAL FLOW COMBINE

BACKGROUND OF THE INVENTION

1. Field of the Invention

The present invention relates generally to improvements in combines and the like and more particularly to a new and improved rotary or axial flow-type combine in which the grate is made up of a plurality of sections that can be removed from the operative position along the lower portion of the threshing cylinder.

2. Description of the Prior Art

In the prior art patents, such as Bedolla U.S. Pat. No. 2,154,483 of Apr. 18, 1939, and Schlayer U.S. Pat. No. 1,688,662 of Oct. 23, 1928, in which axial flow combines are disclosed, there are no means making it possible to conveniently remove or replace the grate. The grates disclosed in the prior art were intended as permanent parts of the machine rather than as something that could be changed to thus customize the combine for the particular crop and/or crop condition. Thus, to change or replace a grate in the prior art machines, would involve a time consuming, major alteration of the basic machine.

SUMMARY

The general purpose of this invention is to provide a grate for an axial flow combine which embraces all the advantages of similarly employed grates and possesses none of the aforedescribed disadvantages. To attain this the present invention contemplates a unique grate made up of a plurality of independent sections each of which are of a weight and size that can be handled by the combine operator. An access door is provided through the sidewall of the combine through which the sections can pass and place into a shelflike support. The final section of the grate is then secured by locking means which because of the interengagement of the several sections functions to hold the entire grate in place. By this arrangement, the grate can be removed in small sections from the side of the combine through a relatively small access opening. Since the locking means on the final section of the grate function to hold the entire grate in place, the entire operation can be performed through the access opening. The several grate sections can be made of different material that will have different performance characteristics when used in the machine. The grate can be made up of sections having indentical performance characteristics or of sections having different performance characteristics. Furthermore, the overall characteristic of the grate can be changed depending upon the relative placement or pattern of the various sections making up the entire grate.

It is an object of the present invention to provide a grate for an axial flow combine that can be readily removed and replaced by the combine operator to thus customize the combine such that the operating characteristics of the grate are optimum for the particular crop and/or crop condition.

BRIEF DESCRIPTION OF THE DRAWINGS.

FIG. 2 is an isolated view of the bottom rear portion of the threshing cylinder including the grate;

FIG. 3 is a cross-sectional view taken along the lines 3—3 of FIG. 2; and

DESCRIPTION OF THE PREFERRED EMBODIMENT

Figure 1:
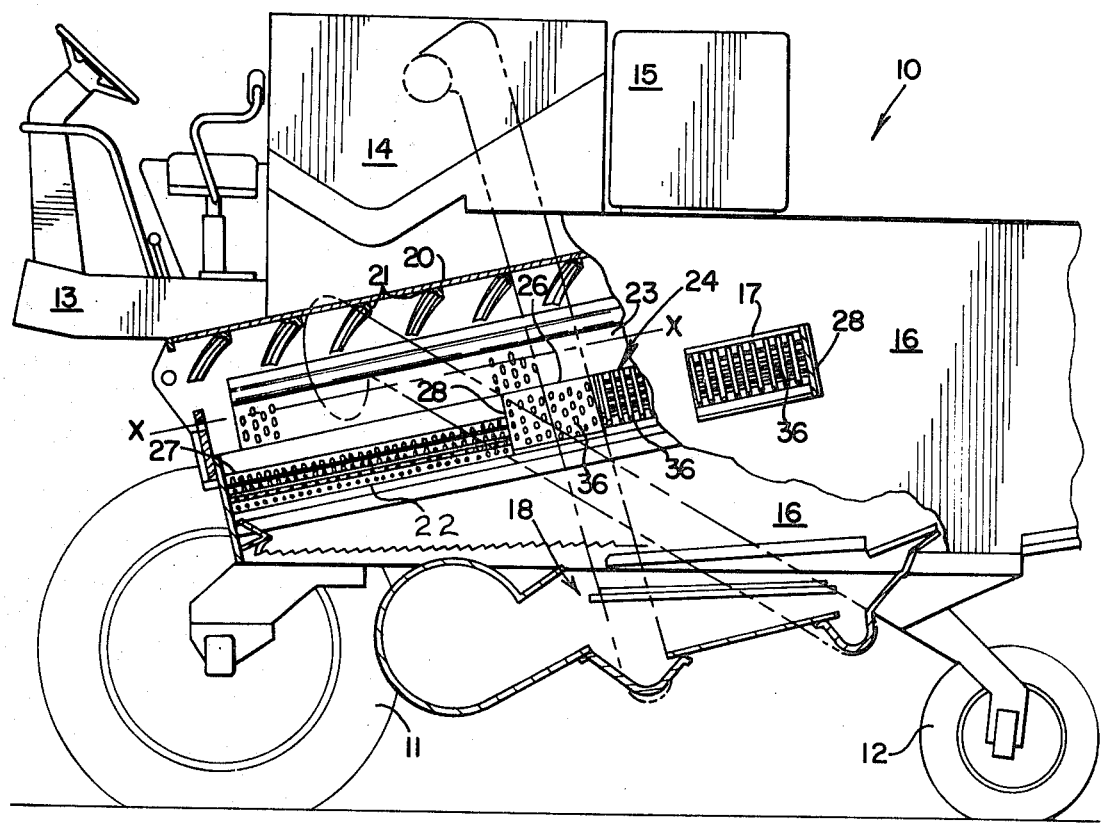
FIG. 1 discloses a side view of a axial flow combine having portions broken away to shown show a cross-sectional view of the threshing cylinder.
Figure 4:
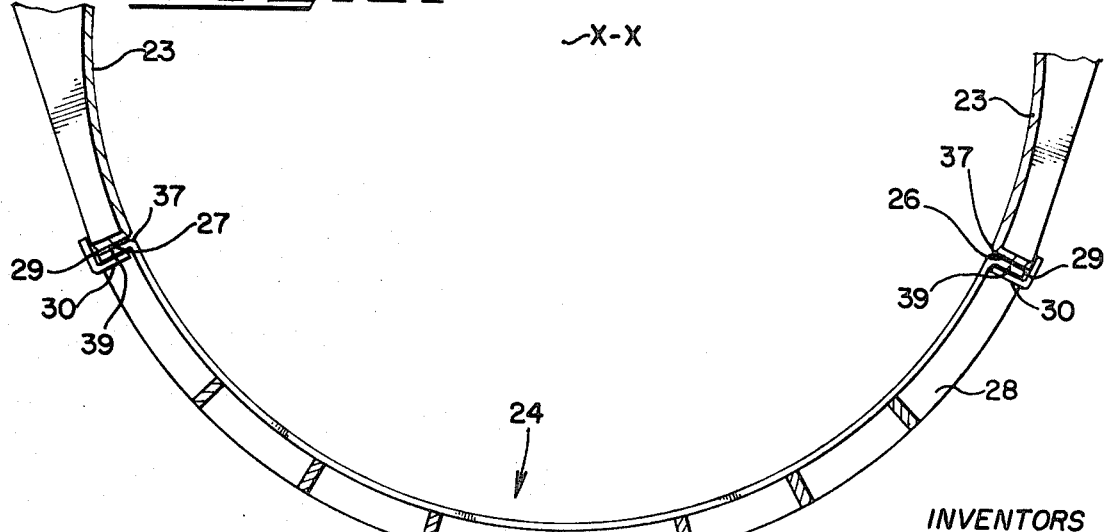
FIG. 4 is a cross-sectional view taken along lines 4—4 of FIG. 2.

Referring now to the drawings wherein like reference characters designate like or corresponding parts throughout the several views there is shown in FIG. 1 an axial flow combine 10 having drive wheels 11, steerable wheels 12, an operator's platform 13, a grain tank 14, a cleaning system 18, and an engine 15. The threshing and separating function is performed within the elongated threshing and separating cylinder 20 which is mounted along the fore and aft axis X-X. The axial flow combine 10 has sidewalls 16 which enclose the elongated threshing and separating cylinder 20. As seen in FIG. 1, the inner surface of the far sidewall 16 is visible surface the outer surface of the far sidewall 16 is visible and the outer surface of the near sidewall 16 is visible. In FIG. 1, a portion of the near sidewall 16 is broken away so that the elongated threshing and separating cylinder 20, which is shown in cross section, can be seen. There is an access opening 17 formed in the near sidewall 16 for a purpose that shall be discussed further. The elongated threshing and separating cylinder 20 has a plurality of transport fins 21 protruding from its internal upper surface. The bottom portion of cylinder 20 is made up of a concave 22, side grates 23, and a bottom grate 24. The concave 22, side grates 23, and bottom grate 24 are all formed of material that will permit the passage of threshed and separated grain therethrough. For a complete disclosure of the operation of an axial flow combine, reference may be had to the applications to Hill et al., Ser. No. 576,151 filed on Aug. 30, 1966, now U.S. Pat. No. 3,481,342, issued Dec. 2, 1969, and Knapp et al. Ser. No. 588,191 filed on Oct. 20, 1966 now U.S. Pat. No. 3,470,881 issued Oct. 7, 1969.

The elongated threshing and separating cylinder 20 has an opening that is filled by the bottom grate 24. The opening is defined by a first cylinder side edge 26, a second cylinder side edge 27, and a pair of arcuate cylinder fore and aft edges 28. There is an inwardly opening shelf 29 formed along the entire length of the first cylinder side edge 26. As can be best seen in FIG. 2 the inwardly opening shelf 29 is formed of a plurality of angle members 30 that are secured as by welding to the cylinder 20 along the first cylinder side edge 26. The free ends of angle members 30 are spaced downwardly from the first cylinder side edge 26 to thus form the inwardly opening shelf 29. It should be noted that shelf 29 could be formed of a single elongated angle member rather than a plurality of short angle members as has been illustrated. There is also an inwardly opening shelf 29 formed along a portion of the second cylinder side edge 27. The remaining portion of the second cylinder side edge 27 has a radially directed and outwardly extending abutment 31 extending therealong. It should be noted that the abutment 31 as illustrated, extends along the entire second cylinder side edge 27, however, it serves a particular function along that portion of the side edge along which there are no angle members 30. This function will be discussed later.

The bottom grate 24 is made up of a plurality of independent sections 36 and as illustrated herein, there are three such independent sections 36. Each of the independent sections 36 are defined by parallel grate side edges 37 and a pair of arcuate grate fore and aft edges 38. Each of the independent sections 36 are formed with flanges 39 that extend radially and outwardly from the parallel grate side edges.

Referring now to FIGS. 2 and 3, it can be seen that the bottom grate 24 can be installed in the opening formed in the threshing and separating cylinder 20 from below by placing flanges 39 into the inwardly opening shelf 29 formed along the first cylinder side edge 26, elevating the other grate side edge 37 until the flange 39 engages the abutment 31 and then sliding the section 36 forwardly such that the flange 39, in engagement with the abutment 31, enters the inwardly opening shelf 29 formed along the second cylinder side edge 27. This first independent section 36 is then slid forward as far as it will go and the operation is then repeated with a second independent section 36. In installing the final independent section 36, the flange 39 is placed into the inwardly opening shelf 29 along the first cylinder side edge 26 the other side edge 37 of the section 36 is then elevated until the flange 39 engages the abutment 31 and it is then secured in this position.

For the purpose of securing the final section 36 in place, apertures 33 are formed in the flanges 39 of all sections 36. Apertures 34 are formed in the abutment 31 such that they are aligned with the apertures 33 when the final section 36 is installed. Locking means 35 such as nuts and bolts, are then inserted through the aligned apertures 33 and 34 and the entire bottom grate 24 is thereby locked into place.

The above procedure for installing the bottom grate 24 can be performed by one person from outside of the combine without the aid of any special tools. The independent sections 36 are inserted through the access opening 17 and slid into place. The final section 36 can then be secured in place by the locking means 35 through the access opening 17. Although it is not shown herein, an access opening door can be provided to close the opening.

As illustrated in FIGS. 1 and 3, the forwardmost section 36 is constructed of perforated sheet metal and it should be understood that the size and the pattern of the perforations would determine the operating characteristics of this section. The second and third sections 36 shown in the drawings are constructed of a latticework of bars and rods which, of course, would have a different operating characteristic than the sheet metal section. A solid (nonpermeable) section could also be provided and used in combination with permeable sections. A combine owner would have a variety of sections 36 having different operating characteristics and he could thus customize his machine by installing the proper type grill for the particular crop conditions. Since all sections 36 would have the apertures 34 formed in the flanges 39, any section can be used as the final locking section, and thus the order of installation is immaterial. This, of course, enables the operator to install the sections 36 in any pattern desired.

It should be understood, of course, that the foregoing disclosure relates to only a preferred embodiment of the invention and that numerous modifications or alterations may be made therein.

We claim:

1. In a combine having an elongated threshing and separating cylinder formed about an axis through which material flows axially:

the bottom portion of said elongated threshing and separating cylinder formed of grain permeable material, said bottom including a removable bottom grate made up of a plurality of independent sections, each of said sections having a generally trough-shape defined by a pair of parallel grate side edges and a pair of arcuate grate fore and aft edges, flanges secured to said grate side edges and extending radially outwardly therefrom;

said elongated cylinder having an opening formed therein corresponding in shape to said removable bottom grate, said opening defined by a first cylinder side edge, a second cylinder side edge and a pair a of arcuate cylinder fore and aft edges;

an inwardly opening shelf secured to said elongated cylinder along the entire length of said first cylinder side edge;

an inwardly opening shelf secured to said elongated cylinder along a portion of said second cylinder side edge, a generally radially directed and outwardly extending abutment occupying the remaining portion of said cylindrical side edge; and means for securing the flange of one section to said abutment.

2. The invention as set forth in claim 1 wherein said combine includes sidewalls enclosing said elongated cylinder, an access opening formed in the sidewall adjacent said abutment through which said independent sections can pass.

3. The invention as set forth in claim 1 wherein each of said independent sections is equal in length to said outwardly extending abutment.

4. The invention as set forth in claim 2 wherein each of said independent sections is equal in length to said outwardly extending abutment.

5. The invention as set forth in claim 1 wherein said means for securing the flange of one section to said abutment comprises apertures formed in said flanges and said abutment and locking means passing through said apertures when they are aligned.

6. The invention as set forth in claim 2 wherein said means for securing the flange of one section to said abutment comprises apertures formed in said flanges and said abutment and locking means passing through said apertures when they are aligned.

7. The invention as set forth in claim 3 wherein said means for securing the flange of one section to said abutment comprises apertures formed in said flanges and said abutment and locking means passing through said apertures when they are aligned.